United States Patent [19]

Okuno et al.

[11] Patent Number: 4,779,018

[45] Date of Patent: Oct. 18, 1988

[54] VIBRATION WAVE MOTOR

[75] Inventors: Takuo Okuno, Yokohama; Susumu Itoh, Tokyo, both of Japan

[73] Assignee: Canon Kabushiki Kaisha, Tokyo, Japan

[21] Appl. No.: 921,010

[22] Filed: Oct. 21, 1986

[30] Foreign Application Priority Data

Oct. 24, 1985 [JP] Japan .................................. 60-238498

[51] Int. Cl.$^4$ ............................................. H01L 41/08
[52] U.S. Cl. ..................................... 310/323; 310/328
[58] Field of Search ................. 310/323, 328, 330–332

[56] References Cited

U.S. PATENT DOCUMENTS

| | | | |
|---|---|---|---|
| 4,019,073 | 4/1977 | Vishnevsky et al. | 310/323 |
| 4,495,432 | 1/1985 | Katsuma et al. | 310/321 X |
| 4,513,219 | 4/1985 | Katsuma et al. | 310/328 |
| 4,562,373 | 12/1985 | Tokusima et al. | 310/328 |
| 4,613,782 | 9/1986 | Mori et al. | 310/328 X |

FOREIGN PATENT DOCUMENTS 1066345 11/1979 Canada ................................ 310/328

Primary Examiner—Mark O. Budd
Attorney, Agent, or Firm—Fitzpatrick, Cella, Harper & Scinto

[57] ABSTRACT

A vibration wave motor including a vibration member having electro-mechanico-converting elements and generating a vibration wave in response to an electric field being applied to the electro-mechanico-converting elements. Also provided is a moving member contacting the vibration member and frictionally driven by the vibration wave generated in the vibratory member. The materials of the portions of the vibratory member and the moving member that contact each other are selected from combinations of hard alumite material and super-hard material.

3 Claims, 2 Drawing Sheets

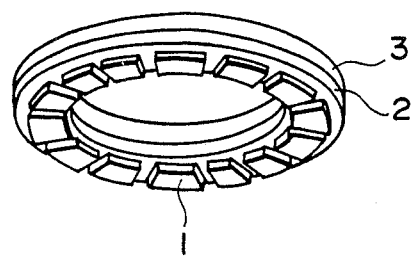
F I G. 1
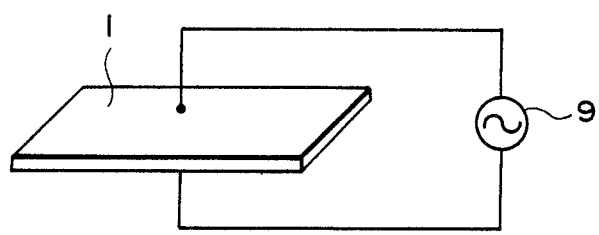
F I G. 2

VIBRATION WAVE MOTOR

BACKGROUND OF THE INVENTION

1. Field of the Invention

This invention relates to a vibration wave motor, and more particularly to the materials of the components of a vibration wave motor.

2. Related Background Art

In recent years, compactness of drive sources has been desired and to this end, vibration wave motors, ultrasonic wave motors or the like have been developed. Such motors include those shown in U.S. Pat. No. 4,513,219 (issued Apr. 23, 1985) and U.S. Pat. No. 4,495,432 (issued Jan. 22, 1985). Such a motor basically comprises a vibratory member in which a vibration wave is generated, and a moving member contacting the vibratory member and frictionally driven by the vibration generated in the vibratory member.

The vibration wave motor is essentially a motor moved by a frictional drive. Accordingly, the output of the vibration wave motor greatly depends on the product $\mu W$ of a pressure force W which presses the moving member into contact with the vibratory member and the friction coefficient $\mu$ of the moving member and the vibratory member. If the pressure force W is increased, the output is considered to increase, but if the pressure force W is excessively increased, the bending vibration of the vibratory member will be suppressed and therefore, the force transmitted to the moving member will be reduced and the output of the motor will be reduced. In a motor utilizing a travelling vibration wave, the moving member is deformed by being pressed and follows the bending vibration wave generated in the vibratory member. In such case, the output is greatly reduced. From the above-noted points, with regard to the frictional drive of the vibration wave motor, the pressure force W cannot be made so great. Therefore, it is necessary to obtain a combination of materials of great friction coefficient $\mu$. Generally, however, if materials of great friction coefficient $\mu$ are rubbed against each other, the amount of abrasion in the friction surfaces thereof becomes very great, and when such materials are used in a vibration wave motor, the life of the vibration wave motor will be very short.

A selection of materials is disclosed in Japanese Laid-Open Patent Application No. 200778/1985. In this application, and a combination of tool steel and aluminum is shown, but this combination is considered to be insufficient to lengthen the life of the motor and obtain a high output.

SUMMARY OF THE INVENTION

It is an object of the present invention to provide a vibration wave motor which has a large output, high durability and a long life.

It is another object of the present invention to provide a vibration wave motor including a vibratory member having electrostrictive elements and generating a vibration wave by an electric field being applied to the electrostrictive elements, and a moving member contacting the vibratory member and frictionally driven by the vibration wave generated in the vibratory member, the materials of the portions of contact of said vibratory member and said moving member being selected from combinations of hard alumite material and a super-hard material.

Specifically, a feature of the present invention is that one of the vibratory member and the moving member is formed by a super-hard material and the other is formed of a hard alumite treated material, thereby providing a vibration wave motor which has a large friction coefficient, a small amount of abrasion and high durability.

BRIEF DESCRIPTION OF THE DRAWINGS

FIG. 1 is a schematic view of the essential portions of a vibration wave motor according to the present invention.

FIGS. 2 and 3A to 3D illustrate the principle of driving of the vibration wave motor according to the present invention.

DESCRIPTION OF THE PREFERRED EMBODIMENT

Figure 3A:
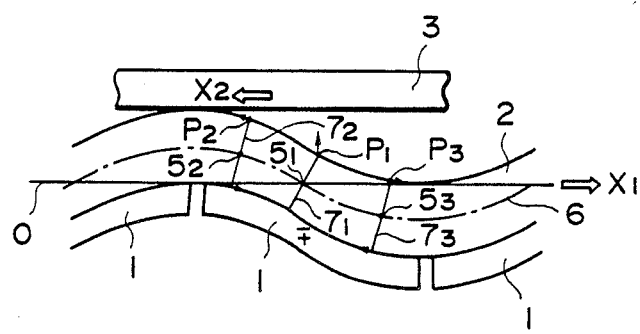

FIG. 1 schematically shows a vibration wave motor according to the present invention which is driven by a travelling vibration wave. In FIG. 1, reference numeral 1 designates electro-mechanico-conversion elements (such as electrostrictive elements or piezoelectric elements) which may be, composed of for example, PZT (titanic acid Zircon lead), and reference numeral 2 denotes a vibratory member formed of a resilient substance and having the electro-mechanico-conversion elements 1 adhesively secured thereto. The vibratory member 2 is held on the stator (not shown) side together with the electro-mechanico-conversion elements 1. Reference numeral 3 designates a moving member which is pressed into contact with the vibratory member 2 to form a rotor. Some groups of the electro-mechanico-conversion elements 1 are arranged at a pitch deviating by an amount corresponding to a quarter of the wavelength $\lambda$ of the vibration wave relative to the other groups of the electro-mechanico-conversion elements. The electro-mechanico-conversion elements in the groups are arranged at a pitch of $\frac{1}{2}$ wavelength so that the polarities of adjacent elements are opposite to each other.

In a vibration wave motor of such construction, a voltage is applied from an AC power source 9 in the direction of thickness (the direction of polarization) of the electro-mechanico-conversion elements 1 as shown in FIG. 2. Thereupon, the electro-mechanico-conversion elements expand and contract in a plane direction orthogonal to the direction of application of the voltage. If the AC voltage then applied to the electro-mechanico-conversion elements in one group is Vo Sin $\omega T$, the AC voltage applied to the electro-mechanico-conversion elements in another group is Vo Cos $\omega T$. Accordingly, adjacent electro-mechanico-conversion elements are opposite in polarity and AC voltages 90° out of phase with each other are applied to the two groups. The expansion and contraction of the electro-mechanico-conversion elements 1 is transmitted to the vibratory member 2, which thus makes a bending vibration in accordance with the pitch arrangement of the electro-mechanico-conversion elements 1. When the vibratory member 2 protrudes at the positions of alternate electro-mechanico-conversion elements, the positions of other alternate electro-mechanico-conversion elements retract. On the other hand, as previously described, one group of the electro-mechanico-conversion elements is at a position spaced by $\frac{1}{4}$ wavelength relative to another group and therefore, the bending vibration progresses through vibratory member 2. While the AC voltage is being applied, vibrations are excited one after another and they become a travelling bending vibration wave which is propagated through the vibratory member 2.

The state of travel of the wave is shown in FIGS. 3A, 3B, 3C and 3D. Assume that the travelling bending vibration wave progresses in the direction of arrow $X_1$. If 0 is the central plane of the vibratory member in its stationary state, the vibratory member 2 in its vibrating state assumes a state indicated by the dot-and-dash line in FIGS. 3A–3D, and a bending stress is produced with respect to this neutral plane 6. Considering a cross-section $7_1$ orthogonal to the neutral plane 6, no stress is exerted on the line of intersection $5_1$ between these two planes and this line of intersection $5_1$ is only vibrating up and down. At the same time, the cross-section $7_1$ is vibrating to the right and the left about the line of intersection $5_1$ like a pendulum. Likewise, a cross-section $7_2$ or $7_3$ vibrates to the right and the left about a line of intersection $5_2$ or $5_3$ like a pendulum.

Figure 3B:
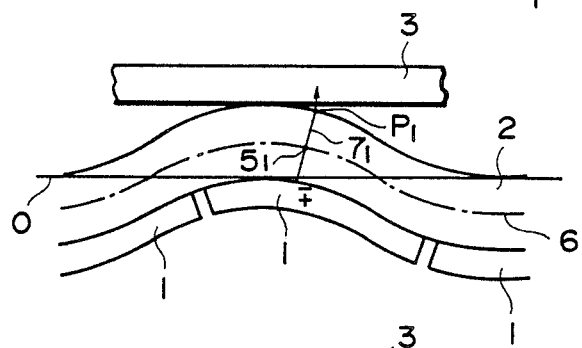
Figure 3C:
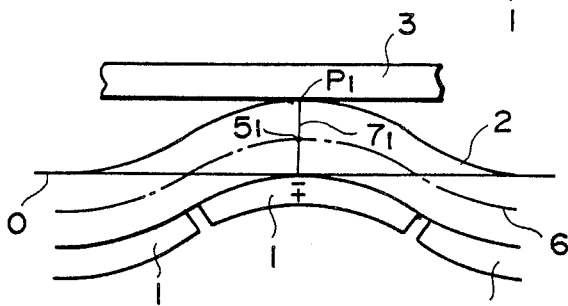
Figure 3D:
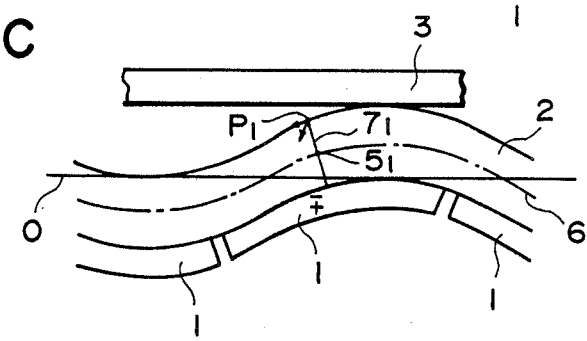

In the state shown in FIG. 3A, a point $P_1$ on the line of intersection between the cross-section $7_1$ and that surface of the vibratory member 2 which is at adjacent to the moving member is the dead point between right and left vibration and is only moving upwardly. This pendulum vibration joins the leftward (the direction opposite to the direction of travel $X_1$ of the wave) stress when the lines of intersection $5_1$ and $5_2$ or $5_3$ are on the positive side of the wave (when they are above the central plane 0), and joins the rightward stress when the lines of intersection are on the negative side of the wave (when they are below the central plane 0). That is, in FIG. 3A a stress in the direction of arrow is exerted on a point $P_2$ when the line of intersection $5_2$ and the cross-section $7_2$ are in the former state. A stress in the direction of arrow is exerted on a point $P_3$ when the line of intersection $5_3$ and the cross-section $7_3$ are in the latter state. When the wave travels and the line of intersection $5_1$ comes to lie on the positive side of the wave as shown in FIG. 3B, the point $P_1$ makes leftward movement and upward movement at the same time. In FIG. 3C, the point $P_1$ makes only leftward movement at the top dead center of upward and downward vibration. In FIG. 3D, the point $P_1$ experiences leftward movement and downward movement. The wave further travels and restores the state of FIG. 3A via rightward and downward movements and rightward and upward movements. By combining these series of movements, it can be seen that the point $P_1$ is making rotational elliptical movement. The moving member 3 is pressed into contact with the vibratory member 2 and, as shown in FIG. 3C, the rotational elliptical movement of the point $P_1$ on the vibratory member 2 frictionally drives the moving member 3 in a direction $X_2$. The points $P_2$ and $P_3$ and all the other points on the vibratory member 2 frictionally drive the moving member 3 as does the point $P_1$.

The material of which the surface of contact between the vibratory member 2 and the moving member 3 is composed will now be considered.

Before the combination of the material of the vibratory member 2 (see FIG. 1) and the material of the moving member 3 (see FIG. 1) is described, an example of the method of testing the friction between a super-hard material and a hard alumite-treated material will first be described. The friction test was carried out by making circular ring-like test pieces of average diameter 22 mm and rotating them while pressing them into contact with each other. The friction coefficient $\mu$ was calculated from the friction torque measured by means of a load meter and the pressure force. The amount of abrasion was found from the variations in the mass of the test pieces before and after the friction test. The result of the test of different materials is shown in Table 1 below. The meaning of the symbols in Table 1 are as follows:

WC.Co: Mixture of tungsten carbide and cobalt of 12% content 12%

Wc.Co: Mixture of tungsten carbide and cobalt of 15% content 15%

WC.TiC.Co: Mixture of tungsten carbide, titanium carbide, tantalum carbide and cobalt carbide and cobalt WC.TiC.TaC.Co: Mixture of tungsten carbide, titanium carbide, tantalum carbide and cobalt Bs: Carbon steel CH: Hard chromium KN plating: Chemical nickel plating CH treatment: Hard chromium treatment It can be seen from Table 1 that the combination of WC super-hard alloy and hard alumite produces excellent results when used as the material forming the friction surface of the vibratory member motor (see mark in Table 1).

TABLE 1

| Moving member | Vibratory member | | | | | | |
|---|---|---|---|---|---|---|---|
| | Bs + CH | Alumina | Al/ hard alumite | WC.Co (12%) | WC.Co (15%) | WC.TiC. Co | WC.TiC. TaC. Co | Bs |
| Rubber brake material | O | Δ | Δ | Δ | Δ | Δ | Δ | Δ |
| Al/hard alumite | X | O | X | ⊙ | ⊙ | ⊙ | ⊙ | Δ |
| S48C | X | X | Δ | Δ | Δ | Δ | Δ | Δ |
| KN plating | Δ | Δ | Δ | Δ | Δ | Δ | Δ | Δ |
| S48C (CH treatment) | X | Δ | Δ | Δ | Δ | Δ | Δ | Δ |
| Alumina | X | X | Δ | Δ | Δ | Δ | Δ | Δ |
| Al | X | X | X | X | X | X | X | X |

⊙: very excellent
O: excellent
Δ: normal
X: bad

Table 2 below shows the result of a performance evaluation test when a mixture of tunsten carbide of content 85% and cobalt of content 15% was used as the material of the vibratory member and hard alumite was used as the material of the moving member.

In Table 2, A 2218: Aluminum alloy material (a result equal to the result shown in FIG. 5 may be obtained if use is made of aluminum alloy material A 5056 or pure aluminum instead of A 2218 shown in FIG. 5).

Table 2 shows the result of a test carried out at the number of revolutions 350 r.p.m. and a pressure force of 2.75 kg for 18 minutes. In this test the friction coefficient is as great as 0.7 and the amount of abrasion is very small. Incidentally, if a friction test is carried out with 4-6 brass which is the parent material and aluminum alloy material (A2218) being under the same conditions, the friction coefficient is only 0.3 or so and the amount of abrasion increases by 100 times.

As described above, the combination of WC superhard alloy and hard alumite is excellent as the material forming the friction surface of the vibratory member motor, but it is very difficult to machine and it is expensive to manufacture a vibratory member of a single super-hard alloy. So, in order to solve such a problem, the vibratory member was formed of a metal such as brass which is capable of propagating an elastic wave therethrough, and was constructed of a composite material comprising a parent material, such as brass, and a WC super-hard alloy in the form of a layer or a coated on the surface of the parent material film. The performance of such a composite material in the vibratory member was found to be entirely the same as that of a vibratory member made of a single super-hard alloy.

The WC super-hard alloy can be made into a layer or a film by the vacuum evaporation method, the sputtering method, the ion plating method, the CVD method, the melting injection method and the electric field plating method.

WC.TiC.Co alloys and WC.TiC.TaC.Co alloys are also effective as a WC super-hard alloy, as shown in FIG. 4.

The thickness of the layer or film of the contact portion of the aforementioned composite material is 1-500 $\mu$m, and preferably 1-50 $\mu$m. Also, WC which is the main component of the super-hard material used for the vibratory member may preferably be of content 80-94% and Co may suitably be of content 6-20%.

TABLE 2

|  | Super-hard material (vibratory member) | Hard alumite material (moving member) |
| --- | --- | --- |
| Composition | WC—Co (85%-15%) | $Al_2O_3$ |
| Forming method | Coating was applied to base material (4-6 brass). | Anode oxidation treatment was applied to material A2218. |
| Hardness | $H_v$ 1076 | $H_v$ 640 |
| Friction coefficient | $\mu \approx 0.7$ | |
| Amount of abrasion | 0.4 mg | 0.5 mg |

As described above, in the present invention, a super-hard alloy having WC as the main component was used as the material of the vibratory member and hard alumite was used as the material of the moving member and therefore, a vibration wave motor having a great driving power, a small amount of abrasion and a long service life was obtained.

While the above-described embodiment is a rotary type vibration wave motor, the present invention may also be applied to a linear driving type vibration wave motor to obtain a similar effect, and the invention may be applied not only to the vibration wave motor of the above-described embodiment in which the moving member is driven by a travelling vibration wave, but also to motors of the type in which the moving member is driven by the vibration of a torsional vibratory member, to obtain a similar effect.

We claim:

1. A vibration wave motor comprising a vibration member having an electro-mechanical-converting element and generating a vibration wave by an electric signal being applied to said electro-mechanical-converting element, and a moving member contacting said vibration member and frictionally driven by the vibration wave generated in said vibration member, wherein the materials of the portions of said vibration member and said moving member that contact each other are selected from combinations of hard alumite material and super-hard material and wherein said super-hard material for said vibration member consists of tungsten carbide of content 80-94% and cobalt of content 6-20%.

2. A vibration wave motor according to claim 1, wherein said super-hard material for said vibratory member consists of tungsten carbide of content 85% and cobalt of content 15%.

3. A vibration wave motor comprising a vibration member having an electro-mechanical-converting element and generating a vibration wave by an electric signal being applied to said electro-mechanical-converting element, and a moving member contacting said vibration member and frictionally driven by the vibration wave generated in said vibration member, wherein the materials of the portions of said vibration member and said moving member that contact each other are selected from combinations of hard alumite material and super-hard material and wherein said super-hard material for said vibration member contains at least two components selected from the group of tungsten carbide, titanium carbide and cobalt.

* * * * *

UNITED STATES PATENT AND TRADEMARK OFFICE
CERTIFICATE OF CORRECTION

PATENT NO. : 4,779,018          Page 1 of 2
DATED      : October 18, 1988
INVENTOR(S): Okuno et al.

It is certified that error appears in the above-identified patent and that said Letters Patent is hereby corrected as shown below:

COLUMN 1

Line 49, "and" should be deleted.

COLUMN 2

Line 3, "by" should read --of--; and

Line 23, "be, composed of" should read

--be composed of,--.

COLUMN 3

Line 22, "at" should be deleted.

Line 23, "is the" should read --is at the--; and

Table 1  "   : very excellent
              : excellent
           △: normal
           X: bad"

should read

--◎: very excellent
            ○: excellent
            △: normal
            X: bad--.

UNITED STATES PATENT AND TRADEMARK OFFICE
CERTIFICATE OF CORRECTION

PATENT NO. : 4,779,018

DATED : October 18, 1988

INVENTOR(S) : Okuno et al.

It is certified that error appears in the above-identified patent and that said Letters Patent is hereby corrected as shown below:

COLUMN 4

Line 27, "Wc.Co:" should read --WC.Co:--;

Line 30, "tantalum carbide and cobalt carbide" should be deleted.

Line 39, "produces" should read --produces very--; and

Line 42, "in" should read --ⓒin--.

COLUMN 5

Line 26, "a coated" should read --a film coated--; and

Line 27, "material film." should read --material.--.

Signed and Sealed this

Eighteenth Day of July, 1989

Attest:

DONALD J. QUIGG

Attesting Officer

Commissioner of Patents and Trademarks